United States Patent [19]

Holle

[11] 4,200,786

[45] Apr. 29, 1980

[54] ELECTROOPTICAL FOCUSING APPARATUS FOR PHOTOGRAPHIC CAMERAS

[75] Inventor: Werner Holle, Wetzlar, Fed. Rep. of Germany

[73] Assignee: Ernst Leitz Wetzlar GmbH, Wetzlar, Fed. Rep. of Germany

[21] Appl. No.: 871,852

[22] Filed: Jan. 24, 1978

[30] Foreign Application Priority Data

Jan. 27, 1977 [DE] Fed. Rep. of Germany ....... 2703290

[51] Int. Cl.² ............................................. G01J 1/36
[52] U.S. Cl. ...................................... 250/204; 354/25
[58] Field of Search ................ 250/201, 204, 214 P, 250/237 G; 354/25; 356/1, 4, 5

[56] References Cited

U.S. PATENT DOCUMENTS

| | | | |
|---|---|---|---|
| 3,953,728 | 4/1976 | Leitz et al. | 250/237 G |
| 3,953,729 | 4/1976 | Hosoe et al. | 354/25 |
| 4,047,022 | 9/1977 | Holle | 250/204 |
| 4,083,056 | 4/1978 | Nakamura et al. | 250/201 |

Primary Examiner—David C. Nelms
Attorney, Agent, or Firm—Gilbert L. Wells

[57] ABSTRACT

An apparatus for electrooptically focusing the objective in a single lens reflex camera provided with a focusing screen and a split image wedge rangefinder, where focus detectors are used in which an image segment is scanned in an image plane. The focusing window of the focusing screen provided with a split image wedge rangefinder (5) is followed by a pentaprism (8) having a first plane reflecting surface which is partly reflecting. The scanning grating (14) and the photoelectric detector system (17,18) are mounted in the direction of the light beam behind this plane surface of the pentaprism and along the optical axis deflected by one of the wedges (5a) and an optics (11) is present along the optical axis to image the plane of one of the wedges (5a) into that plane where the scanning takes place.

4 Claims, 6 Drawing Figures

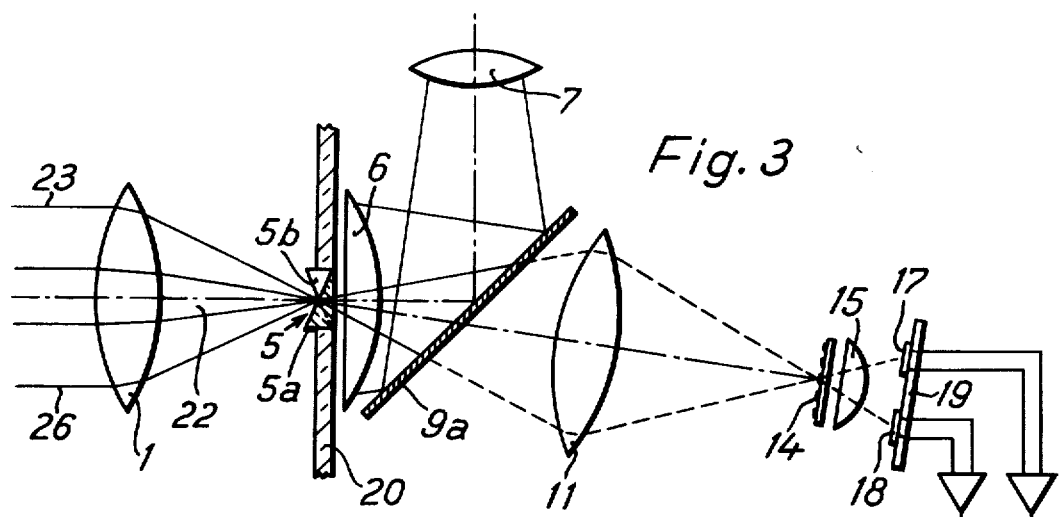
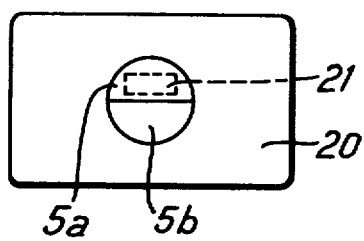
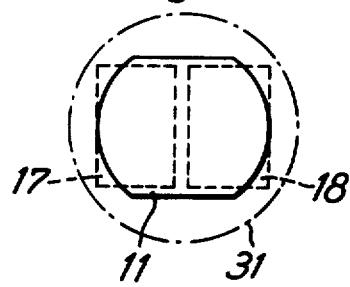
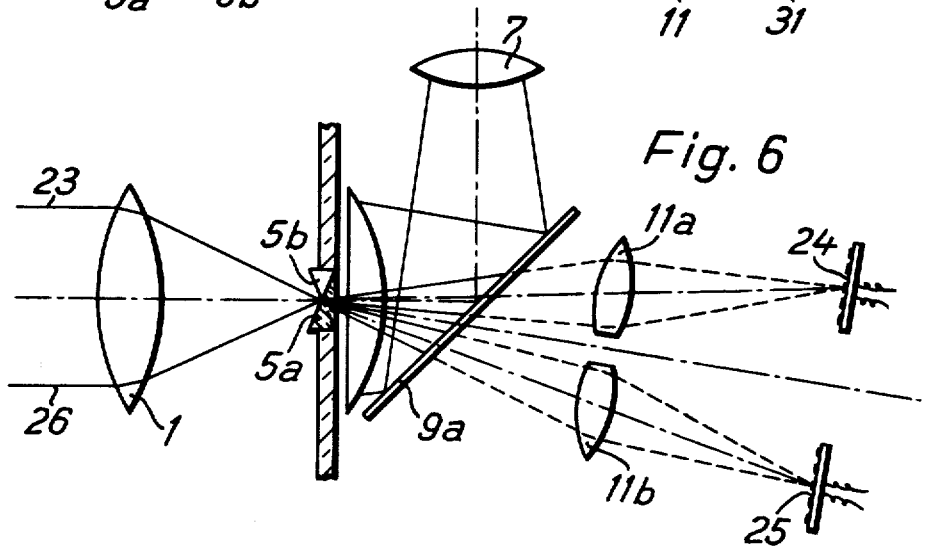

ELECTROOPTICAL FOCUSING APPARATUS FOR PHOTOGRAPHIC CAMERAS

CROSS REFERENCE TO A RELATED APPLICATION

Applicant claims priority under 35 USC 119 for application No. P 27 03 290.2 filed Jan. 27, 1977 in the Patent Office of the Federal Republic of Germany.

BACKGROUND OF THE INVENTION

The present invention relates to an apparatus for electrooptically focusing the photographic objective in a mirror reflex camera.

Such an apparatus is known in the form of focusing detectors scanning an image segment in a conjugated image plane, for instance by using one or more photodiode lines or by spatial frequency filtering using a moving grating, a maximum of the amplitude of this spatial frequency occurring with maximum focus.

U.S. Pat. No. 3,953,728, the disclosure of which is incorporated herein, further discloses adjusting for a phase null in lieu of an amplitude maximum by obtaining two sets of data with different phases from opposite pupil regions.

As in U.S. Pat. No. 3,953,728, the disclosures of U.S. Pat. Nos. 3,856,400 and 3,856,401 are incorporated herein to show the state of the art of apparatus for determining the relative position of the plane of maximum amplitude and the gratings useful in the present invention while U.S. Pat. No. 3,781,110 is incorporated to show the fundamentals relating to the use of push-pull signals.

U.S. Pat. No. 3,953,728 defines an apparatus having an imaging system with at least one optically effective grating where a photoelectric receiver system is employed to determine the relative position of the plane of maximum amplitude of a spatial frequency component in the image of an object. The imaging system has an entrance pupil and this entrance pupil has regions which are traversed by light fluxes emanating from the object. The imaging system forms an image of the object in a plurality of intermediate image planes and the grating displays a given spatial frequency component and is mounted in one of the intermediate image planes for receiving the image and for modulating the light fluxes. The photoelectric receiver system consists of at least two photoelectric detectors responsive to the light fluxes passing through the grating and the detectors generate electrical push-pull signals for use in governing control means. A focusing screen is mounted in the first of the intermediate image planes and has an optical measurement wedge for dividing the focusing screen into two areas. One of the areas is for subjectively observing and focusing the object and the other area has a given size for transmitting and further processing the light fluxes which are selected from one of the regions of the entrance pupil. The grating is located in a second of the intermediate image planes and modulates the light fluxes traversing the selected region while splitting the light fluxes into at least two components. The components are directed to the photoelectric detectors. A pentaprism is positioned between the focusing screen and the grating to fold the beam path. The photoelectric detectors generate signals which control the focusing of the photographic objective of the mirror reflex camera.

When an apparatus, as defined in U.S. Pat. No. 3,953,728, is used in a single lens reflex camera it is known to project a segment of the focusing window of the focusing screen onto the scanning grating, to mount a fully reflecting surface constructed as a concave mirror to the pentaprism at the side facing the ocular, and to keep the central area of this reflecting surface nonreflecting. This nonreflecting area permits observing the focusing window using the viewer ocular.

However, this prior art system suffers from the drawback that the mirror surface next to the necessarily nonreflecting area is too small to reflect light from large aperture angles to the scanning grating. On the other hand, where interchangeable small-aparture objectives are concerned, it is nevertheless necessary to coat the central area previously termed nonreflecting at least to be partly reflecting in order to apply sufficient light for these objectives and to the scanning grating and the subsequent photoelectric detectors.

SUMMARY OF THE INVENTION

Having in mind the limitations of the prior art, it is an object of the present invention to provide an apparatus allowing reliable electrical/automatic focusing even in the presence of low light levels and in the presence of a relatively large aperture of the objective, and furthermore to take into account the diaphragm errors of the wideopen objectives, that is, where possible to focus using the same stop also used when photographing.

On the other hand, another object of the present invention is to construct an apparatus which uses the currently conventional focusing aids (split image prism wedge, prismatic grating) and indeed the split image prism wedge and prismatic grating are advantageously used for monitoring the electrooptical focusing apparatus.

These objects are achieved by the present invention in that the focusing screen is equipped with a split image optical wedge rangefinder and a pentaprism, different from the one in U.S. Pat. No. 3,953,728, is provided in which the first plane reflecting surface is made partly reflecting. The prismatic grating as well as the photoelectric detection system are mounted downstream of this plane surface and along an optical axis determined by the deflection by one of the two wedges. An optical system is provided along this optical axis that projects the plane of one of the wedges into that plane where the scanning takes place.

The pentaprism of the present invention is one in which rays from the focusing screen are first reflected at a plane surface, thereupon are incident on the roof of the prism and from there reach the camera ocular. Such a pentaprism is disclosed in U.S. Pat. No. 3,089,419 and German Pat. No. 839 312.

The present invention is based on the concept that the wedge angle of the split image wedges is kept relatively small when desired because the requirements placed on visual focusing accuracy are only minor in view of the presence of the electrooptical focusing system. Observation using the split image wedges merely serves now to check that the maximum or the null signal from the electrooptical system actually does indicate that the objective is in focus rather than indicating a possible side maximum or a second null in the case of a phase detector.

Because of the small angle of the split image wedges, the beam deflection angle of the electrooptical focusing system also is small compared to the angle of aperture of this component. The angle of the wedges varies between 6 and 10 degrees. If for instance one intends to use light from the relative aperture at least up to f/2.8 for the electrooptical focusing system, and if the wedge angle is designed to correspond to an aperture of f/8, then the deflection angle is about ⅜ of half the angle of aperture of the optical system imaging the wedge onto the scanning grating.

BRIEF DESCRIPTION OF THE DRAWINGS

The present invention is illustrated by embodiments as shown in the drawings, wherein:

FIG. 3 is a side view schematic of the electrooptical focusing apparatus of the present invention with enlarged beam paths;

FIG. 4 is a front view schematic of the split image wedge of FIG. 3 and of the photoelectrically scanned field as marked;

FIG. 5 is an elevation of the intermediate imaging lens and of the photodetector in the direction of arrow A of FIG. 2; and FIG. 6 is a side view schematic of the electrooptical focusing apparatus of the present invention with a modified detector.

DESCRIPTION OF THE PREFERRED EMBODIMENTS

Figure 1:
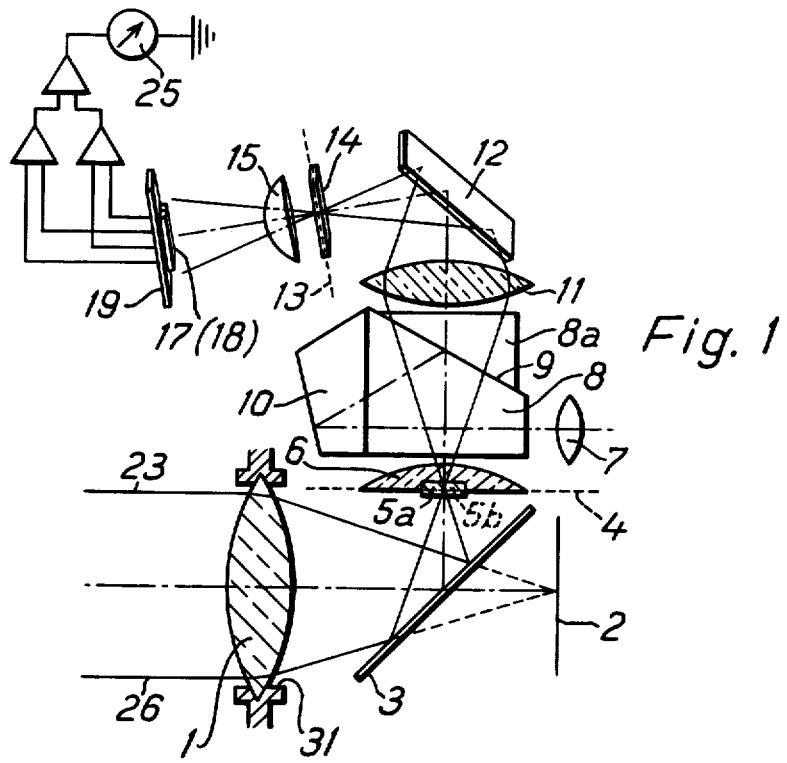
FIG. 1 is a schematic of the essential components of a mirror reflex camera with the electrooptical focusing apparatus of the present invention shown in side view.

With particular reference to FIG. 1, the photographic objective 1 is shown which projects an image of the object onto the film 2 located in the image plane. A mirror 3 is mounted behind objective 1, which is moved upward in its picture taking position when a photograph is taken, as disclosed in any of U.S. Pat. Nos. 3,468,233; 3,529,527 or 3,788,202.

In the viewing position shown, reflex mirror 3 projects an image of the object into a first intermediary image plane 4, in which split image wedges 5a, 5b are mounted with a field lens 6 immediately behind them. This object image is viewed by the user through an ocular 7 and a pentaprism 8. Pentaprism 8 is constructed so that the rays from the intermediate image plane 4 are first reflected by a plane surface 9 and only after some further travel at the pentaprism surfaces 10.

Plane surface 9 is only partly reflecting. An auxiliary prism 8a is cemented onto it. In the direction of travel of the rays and behind prism 8a are mounted a lens element 11 and a fully reflecting mirror 12. Lens 11 projects an image of wedge 5a of the split image wedges 5a, 5b into a second intermediate image plane 13 in which is located an ordinary or a prismatic grating 14 that performs an oscillatory scanning motion as disclosed in U.S. Pat. No. 3,953,728.

The subsequent field lens 15 projects a coarse image of the objective exit pupil, vignetted by the intermediate imaging 8, 9 onto the detector system 19 comprising two photodetectors 17, 18 which in this representation are viewed as being one behind the other. Each photodetector is associated with one pupil half. An electronic circuit such as shown in FIG. 5 of U.S. Pat. No. 3,953,728 measures the phase difference between the AC current components delivered by detectors 17 and 18. In the case of optimum focus the phase difference becomes zero, and this is displayed for instance by a null indicator 25.

Figure 2:
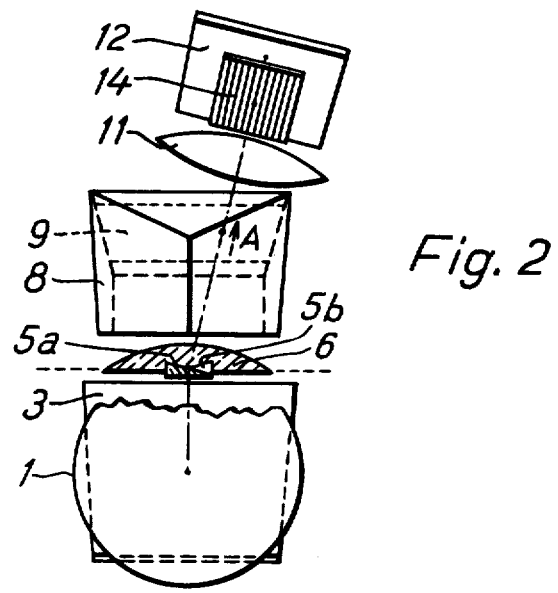
FIG. 2 is a schematic front view of the components of FIG. 1.

The rays passing through wedge 5a are naturally slightly deflected, as clearly shown in FIG. 2 though not shown in FIG. 1. FIG. 2, however, omits the detector system 19 and field lens 13. These components would have to be shown in front of the scanning grating 14 (along the direction of the rays) and would confuse the representation in FIG. 2.

All the components of the present invention are again shown in FIG. 3, where the beam path has been expanded to show its sequence particularly clearly. Again the most important components are shown, that is the photographic objective 1, the split image wedge 5a and 5b, field lens 6, lens 7 and the oscillating scanning grating 14, furthermore an oblique, partly reflecting surface 9a, which however does not represent reflex mirror 3 of the camera but merely symbolizes that surface splitting the beams for visual focusing and for the electrooptical focusing apparatus. In FIG. 1 this is plane surface 9. Therefore this surface is designated 9a in FIG. 3. Pentaprism 8 is omitted from FIG. 3. As shown in FIG. 4 the field of measurement of the oscillating scanning grating 14 is projected back on focusing screen 20 and is represented by field 21 bounded by dashed lines. The field therefore is within the range of one of the two wedges. The small wedge angle is taken into account for the intermediate imaging. The overall light cone, which is bounded by rays 23 and 26, is bent by wedge 5a.

The extension of ray 22 of the photographic objective with an aperture of f/8, for instance, is considered to be the pertinent optical axis for the ensuing intermediate imaging of wedge 5a onto the oscillating scanning grating 14 by means of lens 11. This lens 11 is moved as close as possible to the first intermediate imaging plane even though the imaging of the exit pupil by means of field lens 6 is much more removed, so that rays from wide apertures may also be transmitted for the permissible bulk of the system. It is proposed in particular not to provide this lens 11 with a circular rim, rather it is cut in the direction of the dividing line of the pupil. The arrangement of lens 11 far away from the imaging plane of the exit pupil is feasible because of the small image size (about 4 mm) that is scanned.

FIG. 5 shows the superposed projections of the exit pupil 31 of objective 1, of the imaging lens 11 and of photodetectors 17 and 18 so that for small objective apertures, only part of the detectors is illuminated, while at the largest aperture—which is transmitted lens 11—they are fully illuminated. The shape of the area of the photodetectors is adjusted to the contour of lens 11.

A black white grating is shown in the illustrated embodiments as the scanning grating. Obviously other gratings as well, in particular prismatic gratings are useful too, four photodetectors then being required.

The electrooptical system is also applicable to other focusing detectors. For instance a row of photodiodes may replace scanning grating 14 and can be sequentially interrogated by a shift register, with focusing being achieved for a maximum of high frequencies of the photodiode currents.

FIG. 6 is a variation of the system shown in FIG. 3, where two rows of photodiodes 24, 25 are present and an electronic correlator determines the parallaxes of the two images at the rows. Two lenses 11a, 11b are provided to generate the same viewer image segment from two images using beams, however, from opposite pupil regions, these lens replacing lens 11.

BEST MODE OF CARRYING OUT THE PRESENT INVENTION

The best mode known to the inventor of carrying out the invention comprises the step of supplying a standard single lens reflex camera with the elements 8a, 14, 15, the photodetectors 17, 18 and the electronic circuit as shown in FIG. 1. For setting the scanning grating 14 in an oscillating motion it is connected to a drive mechanism as, for example, disclosed in U.S. Pat. No. 3,856,400. The pentaprism should be of the type where the light rays that are emitted from the split image wedges 5a, 5b first impinge on a plane partially transparent mirror surface and are then partially reflected to the roof edge, while the transmitting light rays travel to the scanning grating.

The angles of the wedges 5a, 5b are to be selected in accordance with the focal length of the objective 1. As is well known in the art there is only one optimal wedge angle for a specific focal length. Consequently, in cameras for use with interchangeable objectives of different focal length, such as telephoto lenses and wide angle lenses, an average wedge angle has to be selected and it is suggested to choose a wedge angle of approximately 8 degrees.

For proper focusing the single lens reflex camera thus outfitted is then to be pointed towards the object and the focusing ring of the objective has to be turned in conventional manner. While aiming the camera at the desired object and keeping the picture thereof within the area of field 21 within the wedge 5a the null indicator 25 has to be observed. Turning the focusing ring of the objective will result in an axial displacement of the lens elements of the objective. This causes the image of the object to become more or less sharp on the film plane and—at the same time—on the scanning grating 14. When the needle of the null indicator 25 shows its least deflection proper focusing of the objective has been achieved.

I claim:

1. In an apparatus for electrooptically focusing an objective in a single lens reflex camera having a focusing screen and a split image wedge rangefinder located along an optical axis, the improvement comprising:
    said focusing screen being followed by a pentaprism along said optical axis and having a focusing window provided with said split image wedge rangefinder having two wedges (5a,5b) deflecting said optical axis, said pentaprism having a first plane reflecting surface which is partly reflecting, a scanning grating for spatial frequency filtering (14) and a photoelectric detector system (17,18) both mounted behind said first plane reflecting surface and along said deflected optical axis of one of said wedges (5a) and an optics (11) along said optical axis for imaging a plane of one of said wedges (5a) into a plane where spatial frequency filtering takes place.

2. The apparatus of claim 1, wherein said wedges of said split image rangefinder each have a given cross sectional area, said grating being movable and having a surface area the size of which covers not more than said given cross sectional area of one of said wedges of said split image wedge rangefinder when projected back thereon.

3. The apparatus of claim 2, wherein said photoelectric detector system comprises a row of photodiodes having a surface area, the size of which covers not more than said given cross sectional area of said wedges of said split image wedge rangefinder when projected back thereon.

4. The apparatus of claim 2, wherein said photoelectric detector system comprises said optics having first and second lenses and two rows of photodiodes (24,25) onto each of which is projected the same image area of one of said wedges (5a) by said first and second lenses and by using light beams of diametrical aperture regions.

* * * * *